United States Patent [19]
Lee et al.

[11] Patent Number: 5,623,566
[45] Date of Patent: Apr. 22, 1997

[54] NETWORK WITH THERMALLY INDUCED WAVEGUIDE

[75] Inventors: Hyung J. Lee; Weyl-kuo Wang, both of Westfield, N.J.

[73] Assignee: Lucent Technologies Inc., Murray Hill, N.J.

[21] Appl. No.: 444,949

[22] Filed: May 19, 1995

[51] Int. Cl.$^6$ .................................................. G02B 6/26
[52] U.S. Cl. ................................................................ 385/24
[58] Field of Search ................................. 385/2–6, 10–12, 385/14–16, 24

[56] References Cited

U.S. PATENT DOCUMENTS

| | | | |
|---|---|---|---|
| 4,900,112 | 2/1990 | Kawachi et al. | 385/14 |
| 5,117,470 | 5/1992 | Inoue et al. | 385/1 |
| 5,418,868 | 5/1995 | Cohen et al. | 385/15 |

OTHER PUBLICATIONS

N. Takato, et al., "Low–Loss High–Silica–Mode Channel Waveguides", *Electron Lett.*, vol. 22, No. 6, pp. 321–322 (1986).

C. Dragone, "An N x N Optical Multiplex Using a Planar Arrangement of Two Star Couplers", *IEEE Photo. Technol. Lett.*, vol. 3, No. 9, pp. 812–815 (1991).

N. Takato, et al., "Silica–Based Single–Mode Waveguides on Silicon and their Application to Guided–Wave Optical Interferometers", *J. Lightwave Technol.*, vol. 6, No. 6, pp. 1003–1010 (1988).

M. Haruna, et al., "Thermooptic deflection and switching in glass", *Applied Optics*, vol. 21, No. 19, pp. 3461–3465 (1982).

*Primary Examiner*—Akm E. Aullah
*Attorney, Agent, or Firm*—George S. Indig; Eugen E. Pacher

[57] ABSTRACT

1×2 and more complex switching operations use routing corresponding with guides produced by heating with a laterally-homogeneous layer. Strip heaters, in contact with a silica-based sandwich structure, thermally increase refractive index to define laterally-constrained cores within the center layer.

18 Claims, 4 Drawing Sheets

NETWORK WITH THERMALLY INDUCED WAVEGUIDE

TECHNICAL FIELD

Optical fiber communications.

DESCRIPTION OF RELATED ART

Twenty years of intense worldwide effort has brought optical fiber and systems to a high level of technological development. The advent of the erbium-doped fiber amplifier and of Wavelength Division Multiplexing ("WDM") translates into near-term systems carrying 40 Gbit/sec of information over fiber spans of 120 km. The technology is on hand to increase capacity by another two orders of magnitude.

Proper utilization of these achievements makes additional demands. Very large transmission capacity raises additional needs for assembling, switching and disassembling the high-bandwidth data streams. No longer are requirements for routing, for adding and dropping signals, and for local distribution to be met by the conventional electronics-based central office, nor yet by any postulated optical analog.

A promising technology for meeting some of these requirements is, "silicon optical bench", in which a silicon single-crystal wafer serves as a high-perfection substrate for silica planar waveguides. It shows low propagation loss (<0.1 dB/cm) and low waveguide-to-fiber coupling loss (<0.05 dB), *Electron. Lett.*, vol. 22, pp. 321–322 (1986). A variety of integrated optic devices have been developed—1×N power splitters, wavelength division multiplexers, and routers. The Dragone router is exemplary. *IEEE Photo. Tech. Lett*, vol. 3, pp. 812–815 (1991).

An adequate general-purpose optical switch is lacking. Large information capacity makes a number of varying demands: long and short response times; long term and short term routing; complex and ever-varying paths. A number of special-purpose structures have been proposed. $LiNbO_3$ devices, based on electro-optic index change, while viewed as expensive, have fast response times and other properties meeting specialized needs, and are used for some applications. Mechanical switches, in which connections are established by physical movement, e.g. of a fiber mounted on a rotatable armature, are suitable in some cases for establishing semi-permanent routing.

For general purposes, there is only one primary operative mechanism—that of the thermo-optic (TO) effect. The well-established guiding material, silica glass, is intractable—generally unresponsive to magnetic fields, to electrical fields, and to optical fields—but does increase refractive index upon heating. Unfortunately, the TO effect is quite small ($\Delta n/\Delta t \approx 10^{-5}/°$ C.) for relevant wavelengths—wavelengths in the range of $\lambda=0.61$ µm–1.6 µm.

The prevalent approach uses the Mach-Zehnder ("M-Z") mechanism. *J. Lightwave Technol.*, vol. 6, pp. 1003–1010 (1988). Paired paths are thermally adjusted to provide a $\pi$ phase mismatch corresponding with the "off" position. Unpowered, the M-Z device may be "on" (equal path lengths), or "off". Reasonably dependable operation, accommodating expected temperature variations, requires long path lengths. This device uses side-by-side waveguide couplers which introduce crosstalk and reduce signal-to-noise ratio. Devices are inherently wavelength-dependent, so that dual wavelength operation (e.g. 1.3 µm telemetry with 1.55 µm carrier) is, for practical purposes, precluded. The need for phase comparison of paired members requires permanent waveguides in both paths with some added complexity in manufacture, and with space implications.

An alternative to M-Z uses TO selection as between unpaired y-branched embedded waveguides. *App. Opt.*, vol. 21, pp. 3461–3465 (1982). This approach, in common with the M-Z device, has design and manufacturing difficulties. All but the simplest devices defy manufacture—maintenance of critical guide dimensions and index delta values, while branching and crossing, is not practically achievable. In operation, the already small TO effect is compromised, and resulting extinction ratios are quite small.

Finally, one proposed TO device dispenses with pre-existing waveguides, and depends on thermal establishment of the path. Devices based on this mechanism have been simple on/off, 1×1 switches, using a TO-induced guide between two facing guides. Drawbacks are: low extinction ratio, since there is significant coupling along the face-to-face path in the "off" position; and mode transition loss at both input and output junctions, since the induced guide is multimode.

SUMMARY OF THE INVENTION

Optical waveguiding depends on thermal inducement of guides within a laterally homogeneous planar medium. Vertical confinement is due to top and bottom constraining cladding layers which are at "single mode" spacing. Horizontal confinement is entirely due to the TO effect. Optimized dimensions and thermal conductivities both permit establishment of the thermally-induced guide (the "TI" guide) in short times—illustratively in milliseconds—and assure steady state thermal conditions thereafter—so that induced guides attain and retain design profiles for periods of from milliseconds to years.

Modal behavior is excellent, assuring both low insertion loss and good coupling efficiency at junctions with fixed planar or fiber guides. In addition to assuring single-mode behavior, the upper cladding layer minimizes propagation loss caused by the contacting metallic heaters of the preferred embodiment, while the lower clad lessens light leakage at the substrate interface. A taper design for further improving inherently good coupling efficiency is shown.

Use together with backup or alternative switching is visualized. TO-induced switching may be used to meet short-term demands, as during emergency shut-down or overload, with mechanical switching supplanting TO for longer term.

Since the induced index change is continuously variable, the TI guide may be used for controlling intensity.

Induced guides are not wavelength specific. They may be used for dual wavelength operation (e.g. as with 1550 nm signaling with 1310 nm telemetry). They are usefully employed with WDM signaling.

DETAILED DESCRIPTION

Terminology

TI Guide—A guide which is thermally induced within the invention-defined, 3-layer, cladding-core-cladding structure.

Slab—The region of lateral shape and compositional homogeneity within which TI guides are induced. The term is sometimes used to differentiate over regions containing etch-defined planar guides and other structures used in composite boards.

General

The inventive concept may be expressed as recognition that materials and dimensions used in planar waveguide structures permit rapid attainment of precisely defined, enduring TO guide structures. In experiments, using the illustrative silicon bench materials, upper clads of a thickness within the range of 10 μm–2.51 μm permitted thermal "construction" of an effectively single mode guide within doped core layers in milliseconds. Thermal sinking by the silicon substrate assures maintenance of the induced guide for indeterminate periods. Alternatives to silicon bench have been pursued—alumina, quartz, sapphire and other substrate materials have been considered for use with planar waveguides. All meet the inventive requirements for heat conductivity and heat sinking.

Initial application will likely use the same silicon bench construction thereby permitting composite structures including both TO and permanent guides. Silica-based materials, i.e. materials regarded as constituted of at least 50 wt. % $SiO_2$, may ultimately be replaced, e.g., in favor of materials with larger temperature coefficient of refractive index. Optimization of TI operation may lead to change in design, e.g. to thinner top clads.

The general concept is that of invariant vertical single-mode guiding together with single-mode thermally-induced horizontal guiding. TI guides manifest low insertion and bending losses. In short, TI guides may follow any route, no matter how tortuous, so long as permitted by heater configuration. Resulting design freedom permits improvement in extinction ratios, e.g. by use of bent TI guides between offset permanent guides to lessen transmission in the off position. The same considerations permit desired separation among outputs which reduces crosstalk. Distortion of embedded cores at branch points and cross points is avoided. Even coincident operation of branching or crossing TI guides may be freed from distortion by appropriate heater design—see, for example, FIG. 6 and accompanying discussion.

Figure 1:
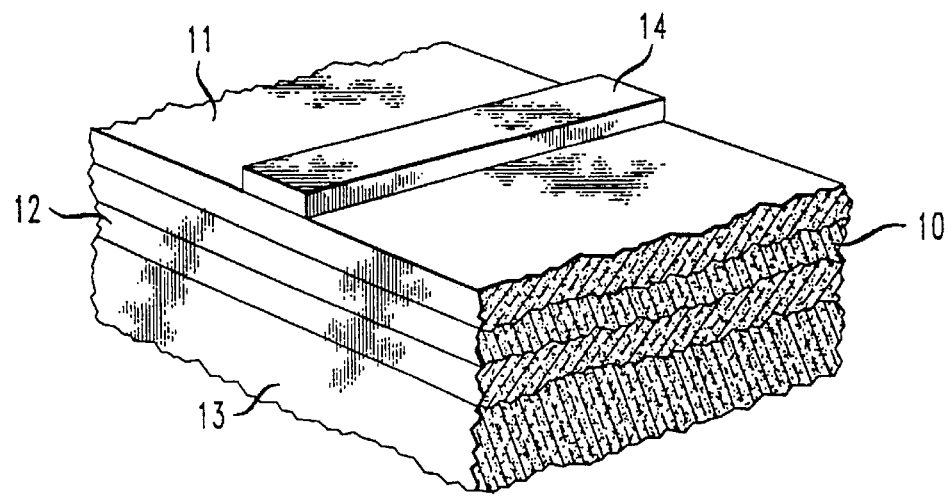
FIG. 1 is a cross-sectional view of a TI device, showing the supported sandwich structure common to all variations of the invention.
Figure 2:
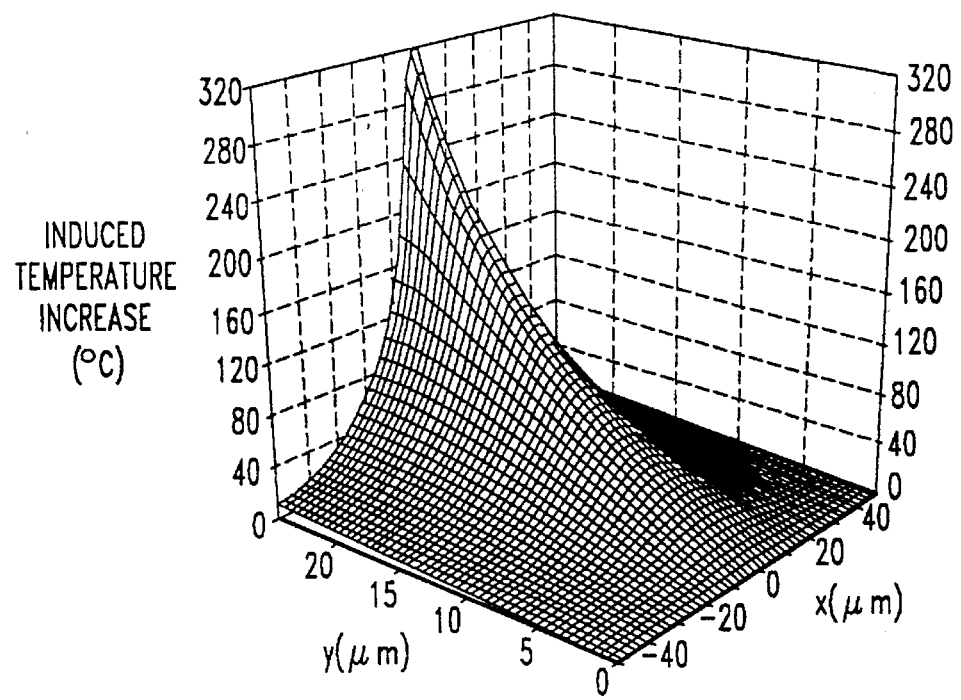
FIG. 2, on coordinates of distance and induced temperature, is a plot showing steady-state thermal conditions in the proximity of a thermally-induced guide.

Discussion of device design in following sections is based on FIGS. 1 and 2. General considerations follow specifics of Example 1 which was the basis for the figures.

It is useful to discuss the invention in terms of a signal wavelength, $\lambda_s$. In description of WDM systems, consistent with general usage, $\lambda_s$ describes the nominal wavelength about which the individual channels are clustered. For dual-wavelength communication-telemetry systems, $\lambda_s$ signifies the wavelength of the signal channel.

Structure

The general structure is shown in FIG. 1. It consists of three layers—core layer 10, upper clad layer 11 and lower clad 12. In the experimental structures discussed, all were of silica-based glass, with layer 10 doped with phosphorus. Preferred structures use core layers of thickness to prevent multi-mode operation in the thickness direction. Such a thickness, referred to as of "single-mode dimension", corresponds with the needed thickness of a conventional fiber core of index profile which is the same as for the present planar structure. The illustrative structure discussed has a core which is single-mode for system wavelengths, $\lambda_s$, including 1.6 μm. Silicon substrate 13 supports the guide structure. TI guides are induced by means of thin film heater 14. In Example 1, total thickness was 25 μm. Core layer 10 was 5 μm thick, lower clad layer 12 was 10 μm. On FIG. 3, successively thinner upper clad layers, 7.5 μm, 5.0 μm, and 2.51 μm, replace the initial layers of thickness of 10 μm. A 2400 Å thick, 10 μm wide, deposited chromium strip, operating at 0.5 W/ram served for "fabrication" of TI waveguides.

The calculated induced-temperature profile, supportive of experimental results, is plotted on FIG. 2. Calculated results are based on identical thermal conductivity for each of layers 10–12, perfect heat-sinking by substrate 13, and negligible heat flow into the air ambient—all a sufficiently-close approximation to real conditions to be meaningful. With heater 14 centered at Y, the surface region (located at x=0 μm, y=25 μm) is at the maximum temperature of 320° C. The temperature profile broadens as depth increases. Using a 10 μm thick upper clad, maximum temperature attained within the core layer was 125° C.

The actual structure used in developing the data of FIG. 1 was the same as used experimentally in the construction of planar waveguides. Construction of a composite board containing both TI and permanent guides, is a natural extension. The silica-based structure is suitable for TI use—its $\Delta n/\Delta t$ of $1\times10^{-5}$ results in an adequate index change of 0.001 upon heating by 100° C. The corresponding extinction ratio is of a value between 15 and 20 dB. Alternative structures/materials may be preferable from the standpoint of TI. $LiNbO_3$ with its $\Delta n/\Delta t$ of $5\times10^{-5}$ offers an index change which is an order of magnitude larger. Organic polymeric materials have coefficients from 10 to 20 times greater than that of $SiO_2$. Depending on thermal conductivity, permitted thinner upper claddings result in sharper profiles to better approach single-mode operation.

Generally, rapidity and durability in switching, are aided by low mass (by thin layers). For the materials used in the examples, thicknesses of 15 μm, 10 μm and 20 μm, respectively for upper cladding, core, and lower cladding, permit milliseconds operation with reasonable heating and should be considered as practical maximum values.

Heater design will likely follow that of the exemplary structure, although under special circumstances, out-of-contact heaters may be used. Intricate guide shapes, especially for short-term use, may be produced by flame heating or with other forms of spaced heaters.

A number of structural variations may be desirable. For example, cladding layers, generally discussed as uniform index, may be profiled. Core layers, ordinarily of single-mode thickness, may by design accommodate two or more modes. Heater strips may be segmented, e.g. for crossing TI guides, so that the crossing TI region is induced by a single heater segment which is common to the alternative guides. Crossing heaters may be electrically insulated from each other.

Temperature Distribution

Data plotted on FIG. 2 is for the described 0.5 W/mm heated silica structure, with an upper clad 11 thickness of 10

μm. X-values show distance as measured laterally to the center of the induced guide—as centered at x=0. Distance, also in μm, from the substrate interface to the heater interface, is shown on the y coordinate. Induced temperature in degrees centigrade is shown on the third coordinate. The maximum temperature increase, at the interface between the top clad and the heater, is 320° C. This temperature is maintained for the central 1 μm region and drops off sharply, having dropped to 160° C. at ±10 μm. At ±50 μm, increased temperature on the free surface is about 10° C.

The core layer is 5 μm thick—extends from the upper clad interface at 1.5 μm to the lower interface at 10 μm. Maximum temperature increase at the upper clad interface is about 125° C, dropping off to about 75° C. at the lower clad interface. For its $\Delta n/\Delta t$ of $1 \times 10^{-5}/°$ C., the temperature gradient in the vertical direction corresponds with a change in index of $5 \times 10^{-4}$, which is about 5.5% of the interfacial $\Delta n$ =0.62%. Under one set of conditions, maximum temperature increase in the center of the core, ~98° C. for a 10 μm clad, increases to >150° C. for a 2.5 μm clad.

Mode-Field Characteristics

Figure 3:
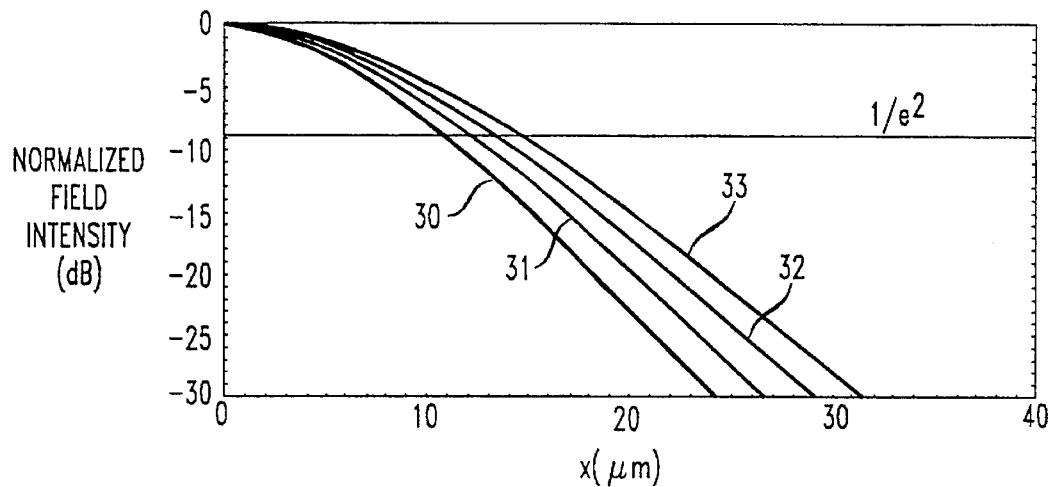
FIG. 3 is a plot showing lateral widths of the induced modes.

FIG. 3, plotted for four different upper-clad thicknesses, shows normalized field intensity in dB for the configuration of FIG. 1, for a heating power of 0.5 W/min. Curves 30, 31, 32, 33 plotted respectively for upper clad thicknesses of 2.5 μm, 5 μm, 7.5 μm, and 10 μm show mode-field widths, measured at $1/e^2$ levels (~8.7 dB), of 22 μm, 24.5 μm, 27.5 μm and 30 μm, respectively. TE and TM polarization modes are indistinguishable for all four curves. Proper choice of upper clad thicknesses must take bending loss characteristics into account. Where bending loss is not controlling, clad thickness is based on propagation loss due to the metal film heater.

In principle, determination of mode content by the lateral dimension of the guide does not deviate from usual guide design. Complications are introduced by implicit limitations of the induced structure. Primary is the magnitude of $\Delta n$—the difference in refractive index between the induced core and the embracing "unheated" material—which is substantially smaller than in the usual permanent guide. The nature of the TI guide—that of a gently graded index in the lateral direction—will likely permit some fraction of the transmitted energy to be coupled to the second, or even to a higher order mode. Insertion loss measurements of about 0.3 dB—with coupling and bending contributions—suggest that at least 90% of the energy is in the first mode. Under most operating conditions an insertion loss of ~0.5 dB is acceptable.

While there is no disadvantage to bimodal operation beyond loss implications, it is possible to more closely approach single-mode operation. Conditions include reduction in core size, in turn requiring a steeper temperature profile in the core region. Without changing other operating conditions, this in turn requires a thin upper clad (to assure effective heat conduction). Thinning, however, places a larger fraction of the modal field in the clad and increases propagation loss at the heater interface.

Thinning of the upper clad from that of silicon optical bench structures now in experimental use for (permanent) planar waveguides, requires increasing the core index (increasing the refractive index of the unheated core) from the value of 1.454 of a common experimental structure. Increasing the core index to ~1.48, to yield a $\Delta n$=2.4%, relative to undoped silica clad, permits thinning to about 2.5 μm, thereby halting the width of the temperature profile as compared to that shown in FIG. 2. The same $\Delta n$ value, attainable through down-doping of the upper clad—or by a change in the material system—is sufficient to effectively assure advantages of single-mode operation for appropriate design and operating conditions. Factors include heater width, heater power, intimate heater-clad contact, thin lower-clad assuring effective heat sinking, etc.

A number of considerations lead to a compromise value of about 7.5 μm for the thickness of the upper cladding. The conclusion is based on extensive study using the silica-based layered materials discussed as illustrative in conjunction with FIG. 1.

Operating parameters have not been optimized. A heating power of 0.5 W/mm was found suitable for the described materials and configurations. Variation within the range of from 0.1 W/mm to 1.0 W/mm, permitted operation. Silicon Nitride is an example of a material of larger refractive index which may permit operation at still lower power levels. (Assuming tolerance for needed doping levels without impairment of optical properties, higher index core layers may be thinner. Without any further assumptions, thinner cores allow narrower temperature profiles, with accompanying better-defined cores.) Substitution of organic materials, with their lower thermal conductivities, may permit switching with less heating. A danger is increased TI guide size, with higher mode operation. Where necessary, forced cooling or structures designed for more effective heat transfer may permit higher heating levels. Other variations may be accommodated empirically.

Propagation Losses

Light absorption by the heater strip—the fundamental loss mechanism—while decreasing exponentially with increasing thickness of the upper cladding, has different values for different wavelengths. In general, loss increases with increasing wavelength. Using a 7.5 μm upper clad, measured loss increased about six times for 1.55 μm relative to 1.31 μm operation. In addition, there is greater than order-of-magnitude increase in loss for TM relative to TE mode. Use of a core layer thickness of 5 μm and upper clad thickness of 7.5 μm keeps the metal loss below 0.2 dB/cm under expected operating conditions.

Leakage loss at the interface between the lower cladding thickness and the silicon substrate is relatively small. Dependence on thickness is about the same as for the heater: loss for the TM polarization is higher. A lower cladding thickness of 10 μm maintains leakage loss below 0.01 dB/cm under expected operating conditions.

Bending Loss

As in discussion of propagation losses, specific discussion is for 1.55 μm operation of the FIG. 1 structure using silica-based layers—core index of 1.454 and clad index of 1.445. Bending loss is greater for longer wavelength operation—from 2× to 10× greater for 1.55 μm than for 1.31 μm, for bend radii of from 5 to 10 cm. Maintenance of bending loss, less than 0.1 dB/cm for a bend radius of 8 cm, suggests an upper cladding thickness of 7.51 μm or less.

Switch Function

The remaining figures illustrate switch designs utilizing the inventive teaching.

Figure 4A:
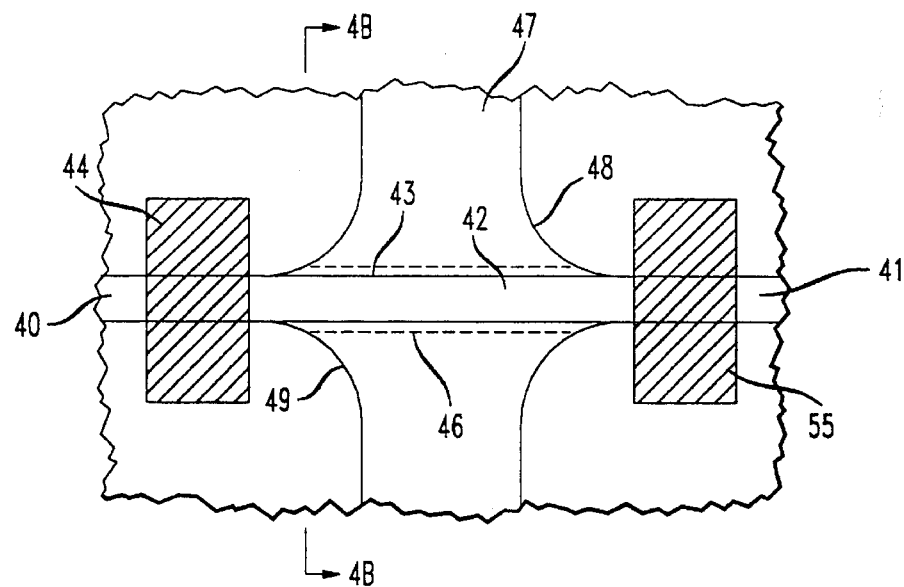
FIG. 4A is a plan view of an on/off "1×1" switch.

FIG. 4A shows a simple on/off switch, which, in the on position, depends on a TI guide. It consists of permanent guides 40 and 41 which terminate to define gap region 42. A heater strip 43, electrically connected to electrodes 44 and 45, induces TI guide 46, shown in phantom, when energized. The entire structure is fabricated from a substrate-supported sandwich such as shown in FIG. 1. Slab region 47 retains core and clad layers, which were selectively removed elsewhere during formation of the permanent guides.

Figure 4B:
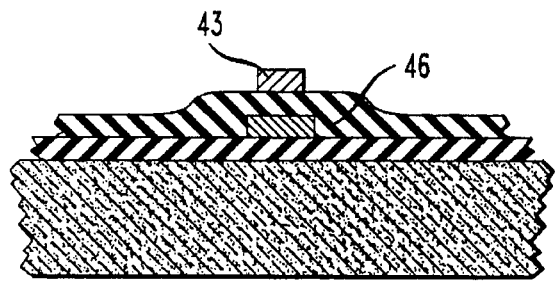
FIG. 4B is a cross-sectional view of the switch shown in FIG. 4A.

FIG. 4B is a sectional view of the device of FIG. 4A illustrating a preferred embodiment of the invention. The sectional view is taken part way along a taper region produced by etch definition. The view shows the tapered core encompassed both at top and edges within the top cladding. Fabrication follows usually prescribed planar waveguide practice, in accordance with which core regions are etch-defined prior to deposition of the upper cladding. The practice assures edge-guiding and protection, and is conveniently followed in the construction of composite boards including both permanent guides and TI slabs. Succeeding sections from that shown to the slab would show successively-increasing TI guide, at first co-extensive with retained core, and finally, TI guide within retained unheated core material. The purpose of the taper is to relieve loss-inducing mode mismatch. FIG. 4B illustrates the taper region within which TI guide width is determined by edge-guiding of retained core material rather than by temperature profile. As the slab region is approached—as the taper broadens—the guide attains its steady-state, profile-determined width. In the taper region, as in the slab, preferred operation requires a TI waveguide of sufficient width to support only the first mode.

While there are other means for realizing the smooth transition of the taper region, FIG. 4B is intended as well to illustrate likely commercial implementation. This is consistent with the major thrust of the invention. The figures are primarily intended to show features essential to the invention. Here, as in other description, fabrication may include additional protective layers as well as construction of active and other passive elements.

Figure 5A:
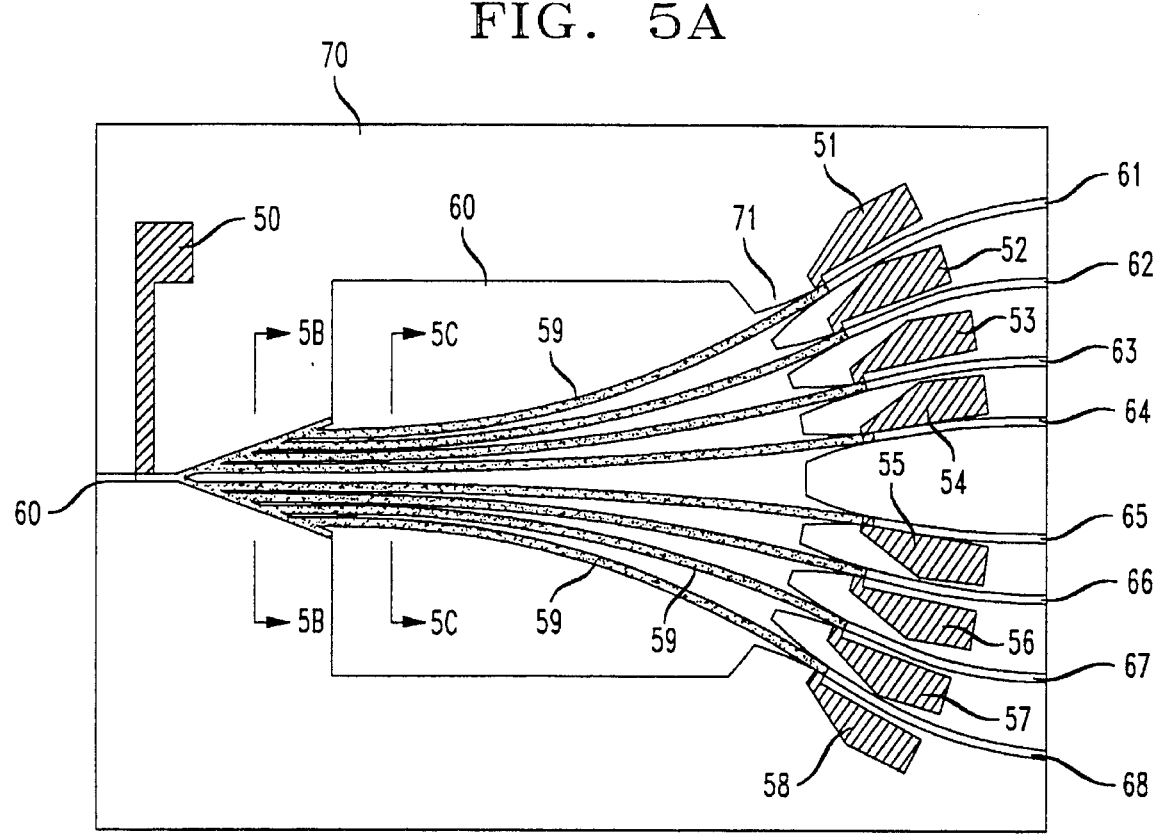
FIG. 5A is a plan view of a 1×8 switch.
Figure 5B:
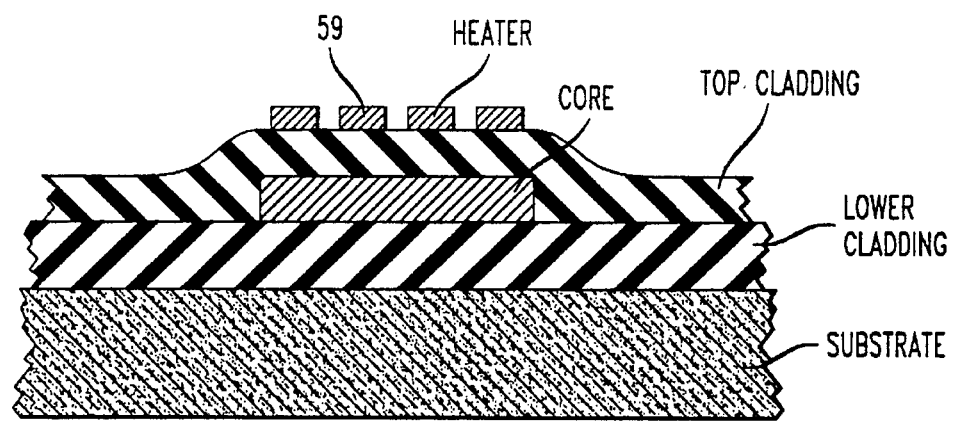
FIGS. 5B and 5C are cross-sectional views showing the switch of FIG. 5A.
Figure 5C:
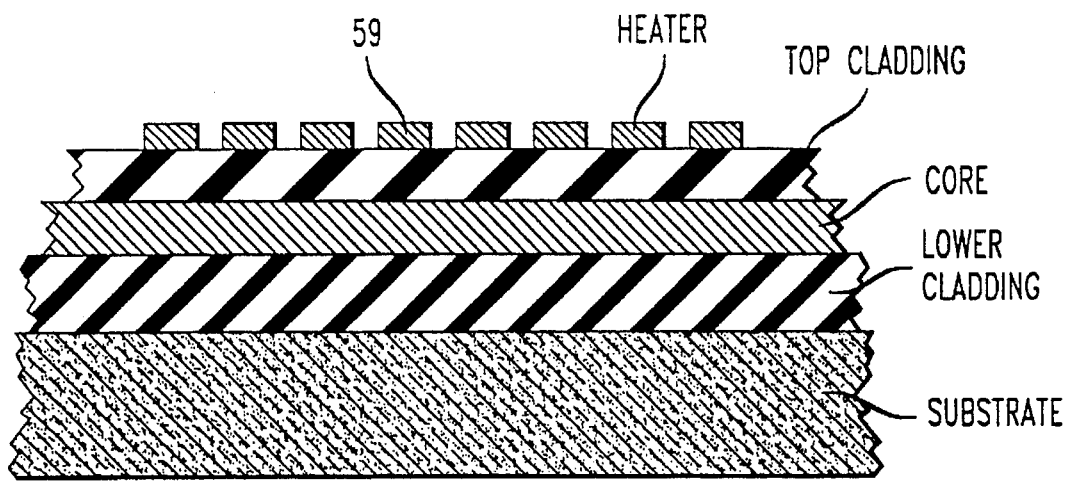

The device of FIGS. 5A–5C, illustratively constructed within the structure of FIG. 1, is a 1×8 switch unit. It is an example of 1×N switches with N=>2. Complimentary N×1 structures are feasible—by regarding input and output guides as interchanged, the switch shown becomes an N×1 device.

Similar to the on/off switch of FIGS. 4A and 4B, the FIG. 5A structure consists of heater electrodes 50 and 51–58 and associated heater strips 59, which define paths of TI guides which, upon actuation of an appropriate electrode pair, interconnects incoming guide 60 with any of outgoing guides 61–68. The 69 slab portion of assemblage 70 retains the unpatterned sandwich structure of the initial body, with the entire structure shown as rectangular body 70.

FIGS. 5B and 5C should be considered together with FIG. 4B. All show versions of the preferred taper structure. In fabrication, the taper was etch-defined prior to deposition of the upper cladding. Operation is identical to that described in FIG. 4B—the core, tapered from permanent guide width to profile-determined TI guide width, minimizes mode mismatch. For composite structures—for structures providing both for permanent guides and TI guides—the same layered structure may serve for both. FIG. 5B shows four heater strips 59 overlying a region part way along a taper.

FIG. 5C depicts a region within which TI guide width is determined by thermal conditions, and is included for comparison. The cross-sectional position, between input and outputs, has not yet attained full output width.

Figure 6:
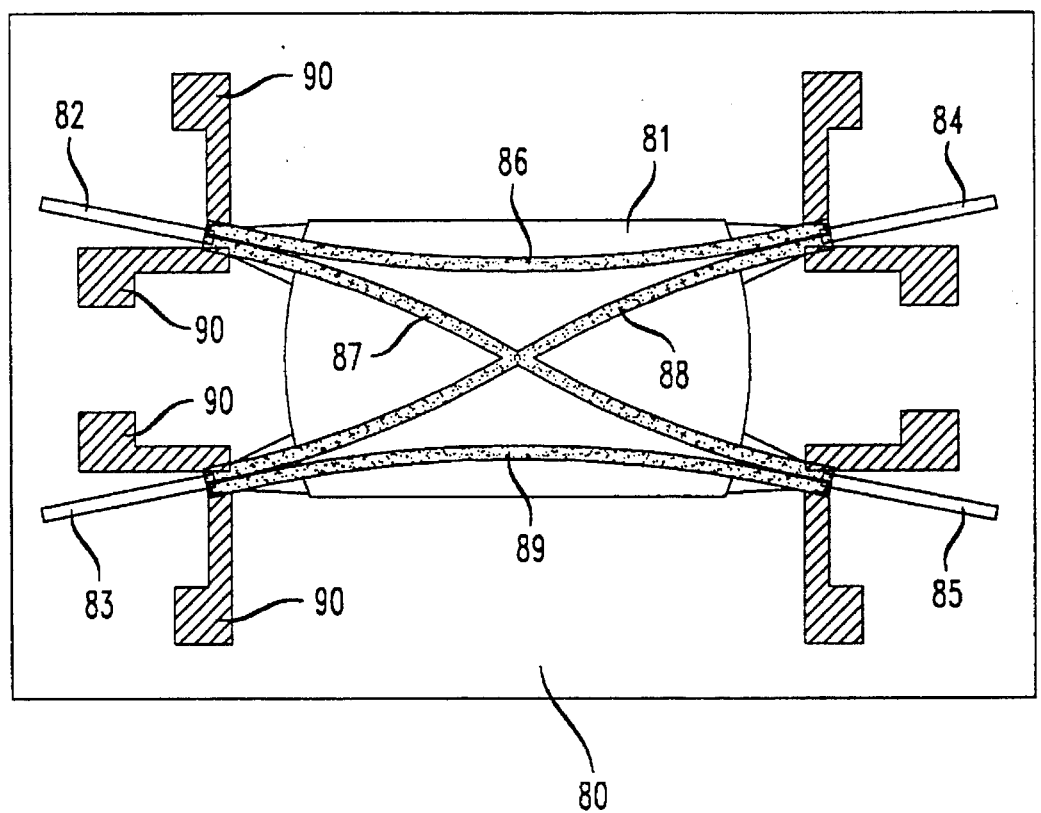
FIG. 6 is a plan view of a 2×2 switch.

FIG. 6 shows an N×N structure with N=2. It illustrates an advantage of TI guiding in comparison with MZ or other structures using embedded fixed waveguides, in that crossing guides need not be maintained simultaneously. Construction is similar to that of the 1×8 switch of FIG. 5, consisting of a silicon substrate 80, a slab 81 on which the entire sandwich is retained, permanent guides 82, 83, 84, and 85 heater strips 86, 87, 88 and 89 each energized by an associated pair of electrodes 90. By providing individual electrodes pairs, heaters 87 and 88 may be constructed of a continuous single-patterned layer at the crossover. (The illustration uses common electrodes for certain heater pairs where permitted, e.g. use of a single electrode at the termini of heaters 86 and 87 maintains selectivity.)

EXAMPLES

Example 1

The structure shown in FIG. 1 was used to construct a 1×2 switch. The slab consisted of a 10 μm thick upper clad, a 5 μm thick core and a 10 μm thick lower clad, on a silicon substrate. Refractive indices were: $n_{clad}$=1.445; $n_{core}$=1.454, both as measured at λ=1.55 μm. A 10 μm wide deposited chromium heater served for inducing either of two waveguides of approximately length 45 mm and attaining spacing of 100 μm at maximum divergence. The surface temperature attained during heating was 320° C., resulting in the profile of FIG. 2. The extinction ratio—light intensity in induced guide/light intensity in unheated core layer—was 18 dB. Steady-state conditions were attained in less than 10 msec. There was no measurable change in thermal profile after two hours of operation with unchanging guide path.

Example 2

The general structure of Example 1 was used for a test specimen designed to determine a variety of losses: loss due to mode mismatch at input taper; bending loss; loss due to mode mismatch at output taper. The sandwich clad-core-clad was unchanged from that described in Example 1. The input taper is described as matching to a permanent waveguide of 5 μm width through a core taper of length 1.5 mm and of maximum width 100 μm. The induced guide route in between tapers was 4.5 mm long and changed direction through a smooth bend of a radius of 10 cm. The output taper was identical to the input taper. The loss of the entire structure measured in between permanent guides was 0.3 dB.

Variations

Profile stability of TI waveguides is a particular value. Nevertheless, backup structures providing for alternative switching means, are contemplated, if only to conserve power. One arrangement provides mechanical switching, perhaps to replace on-position TI switches, at spaced time intervals. Local arrangement to inactivate one set of switches upon activation of the other, will enable emergency use.

What is claimed is:

1. Optical network for operation at a system wavelength, $λ_s$, the network comprising a plurality of fixed waveguides including input and output waveguides, together with heating means for inducing a thermo-optic waveguide for providing selective coupling between at least two fixed waveguides,

CHARACTERIZED IN THAT the thermo-optic waveguide is induced in a structure comprising an upper clad layer, a core layer, and a lower clad layer, in order to produce a "TI" waveguide, in which the TI waveguide, over a substantial part of its length, is embraced within the core layer, the width of the TI waveguide being defined as the heated portion of the core layer including the position of attained peak temperature increase, and bounded by positions of 50% of the peak temperature increase, wherein the upper cladding layer, core layer and lower clad layer are all composed of silica based glass, and wherein the thickness of the core layer is a single mode dimension for $\lambda_s$.

2. Network of claim 1 in which fixed waveguides to be coupled include an input waveguide and an output waveguide.

3. Network of claim 1 comprising a thermo-optic 1×1 switch.

4. Network of claim 1 comprising a thermo-optic switch providing for alterative TI waveguides.

5. Network of claim 4 in which alternative TI waveguides couple with alternative output waveguides, so that the thermo-optic switch constitutes a 1×N switch with $N \geq 2$.

6. Network of claim 4 in which alternative TI waveguides couple with alternative input waveguides, so that the thermo-optic switch constitutes a N×1 switch with $N \geq 2$.

7. Network of claim 4 in which alternative TI waveguides couple alternative paired input and output guides, so that the thermo-optic switch constitutes an N×N' switch with $N \geq 2$ and $N' \geq 2$.

8. Network of claims 5, 6 or 7 in which alternative paths cross.

9. Network of claim 1 comprising an integrated optic circuit in which both fixed waveguides and TI waveguides are constructed within a laterally homogeneous structure, TI waveguides being induced within retained "slab" regions which do not contain fixed waveguides.

10. Network of claim 9 in which fixed waveguides are etch-defined by removal of selected regions of core layer.

11. Network of claim 10 in which fixed waveguides to be coupled include taper regions of increasing width of retained core layer from fixed to TI guides.

12. Network of claim 1 in which the structure includes a substrate consisting essentially of single-crystal silicon.

13. Network of claim 12 in which the maximum thickness of the upper clad layer is 15 μm.

14. Network of claim 13 in which the maximum thicknesses of the core layer and the lower clad layer are respectively 10 μm and 20 μm.

15. Network of claim 1 in which each heating means comprises deposited metal.

16. Network of claim 1 including additional switching means for selective coupling.

17. Network of claim 16 in which the additional switching means comprises a mechanical switch, and in which activation of the mechanical switch deactivates the thermo-optic switch.

18. Network of claim 1 for WDM operation.

* * * * *